(12) United States Patent
Ruppert et al.

(10) Patent No.: US 8,328,975 B2
(45) Date of Patent: Dec. 11, 2012

(54) WINDOW SURROUND FOR A MOTOR VEHICLE

(75) Inventors: Gerald Y. Ruppert, Wixom, MI (US);
Peter J. Ellis, Rochester Hills, MI (US);
Steven C. Dubay, Rockford, MI (US)

(73) Assignee: Decoma International Inc., Concord, Ontario (CA)

( * ) Notice: Subject to any disclaimer, the term of this patent is extended or adjusted under 35 U.S.C. 154(b) by 119 days.

(21) Appl. No.: 12/924,950

(22) Filed: Oct. 8, 2010

(65) Prior Publication Data

US 2011/0030282 A1 Feb. 10, 2011

Related U.S. Application Data

(62) Division of application No. 11/037,656, filed on Jan. 18, 2005, now abandoned.

(51) Int. Cl.
*B32B 37/02* (2006.01)
*B60J 1/10* (2006.01)

(52) U.S. Cl. ........ 156/245; 264/252; 264/261; 264/263; 264/279.1; 296/146.2

(58) Field of Classification Search .......... 264/252, 264/261, 263; 296/146.15, 146.16, 146.2, 296/146.5, 146.3; 49/502; *B60J 10/00, 10/02, B60J 10/06, 1/10*
See application file for complete search history.

(56) References Cited

U.S. PATENT DOCUMENTS

| 4,649,668 A | 3/1987 | Skillen et al. | |
| 4,653,230 A | 3/1987 | Seo et al. | |
| 5,343,609 A | 9/1994 | McManus | |
| 5,557,890 A * | 9/1996 | Levy et al. | 49/502 |
| 5,846,463 A | 12/1998 | Keeney et al. | |
| 6,223,470 B1 * | 5/2001 | Millard et al. | 49/374 |
| 6,250,017 B1 | 6/2001 | Tessier | |
| 6,260,254 B1 | 7/2001 | Mueller et al. | |
| 6,663,165 B2 | 12/2003 | Naito et al. | |
| 6,817,651 B2 * | 11/2004 | Carvalho et al. | 296/146.2 |
| 2001/0034976 A1 | 11/2001 | Maass | |
| 2005/0229496 A1 | 10/2005 | Tashima et al. | |
| 2005/0269741 A1 * | 12/2005 | Rigby et al. | 264/261 |
| 2010/0001550 A1 * | 1/2010 | Janisch | 296/146.2 |

FOREIGN PATENT DOCUMENTS

| GB | 2411924 A * | 9/2005 |
| JP | 04303018 A * | 10/1992 |
| JP | 07277001 A * | 10/1995 |
| JP | 2001071752 A * | 3/2001 |
| WO | WO 03/093044 | 11/2003 |
| WO | WO 2004030965 A1 * | 4/2004 |

* cited by examiner

*Primary Examiner* — William Bell
(74) *Attorney, Agent, or Firm* — Miller Canfield

(57) ABSTRACT

A fixed window assembly is adapted to be fixedly secured to a door of a motor vehicle having a retractable window pane. The fixed window assembly includes a fixed window pane having an outer periphery. A division post extends along a portion of the outer periphery of the fixed window pane. A glass run is fixedly secured to the division post opposite of the fixed window pane for receiving the retractable window pane. The glass run is formed from a first moldable material. An encapsulation is molded to the fixed window pane to secure the division post thereto. The encapsulation is formed from a second moldable material that is different from the first moldable material.

20 Claims, 7 Drawing Sheets

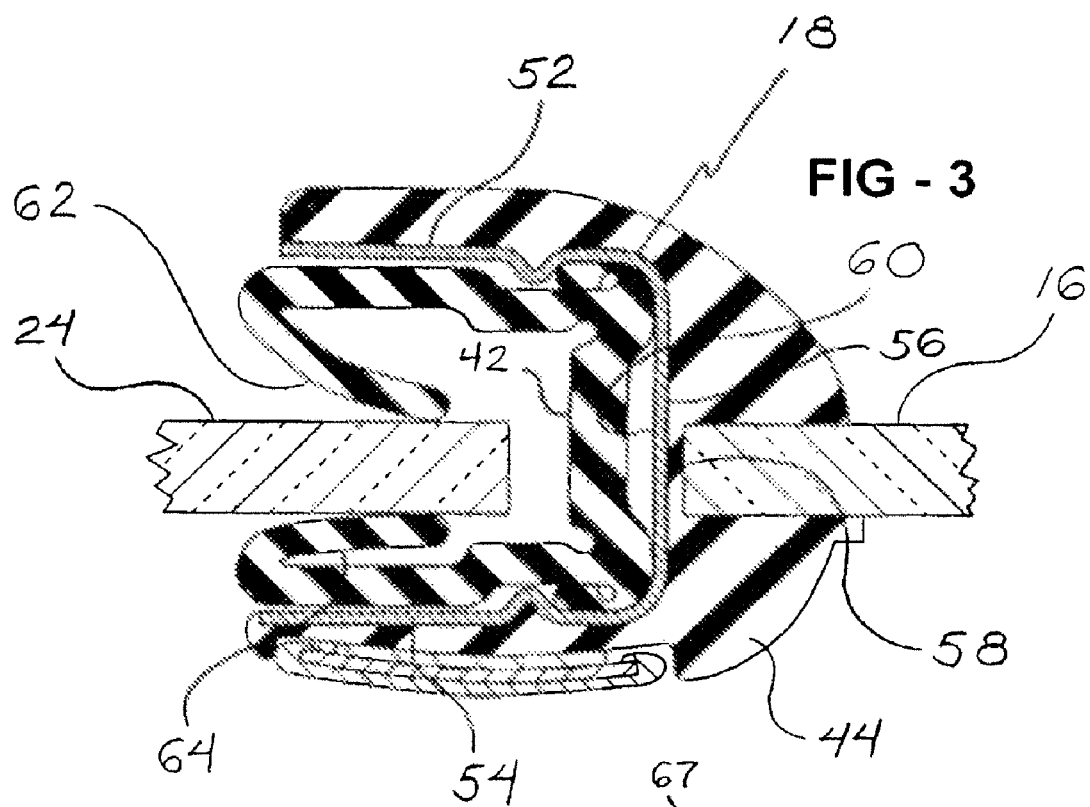
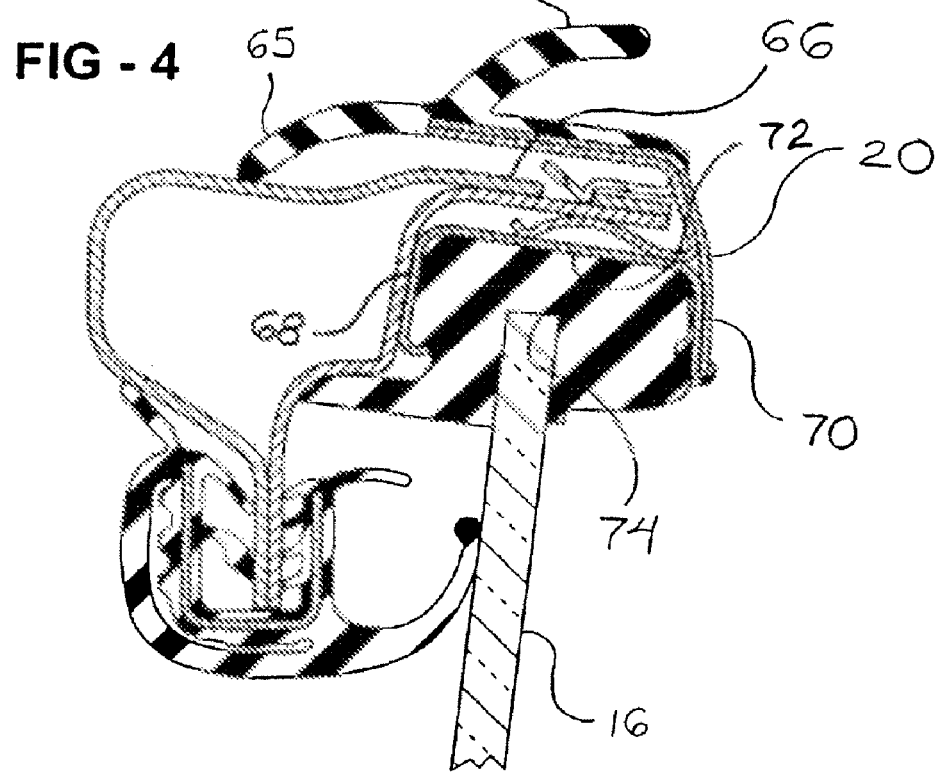

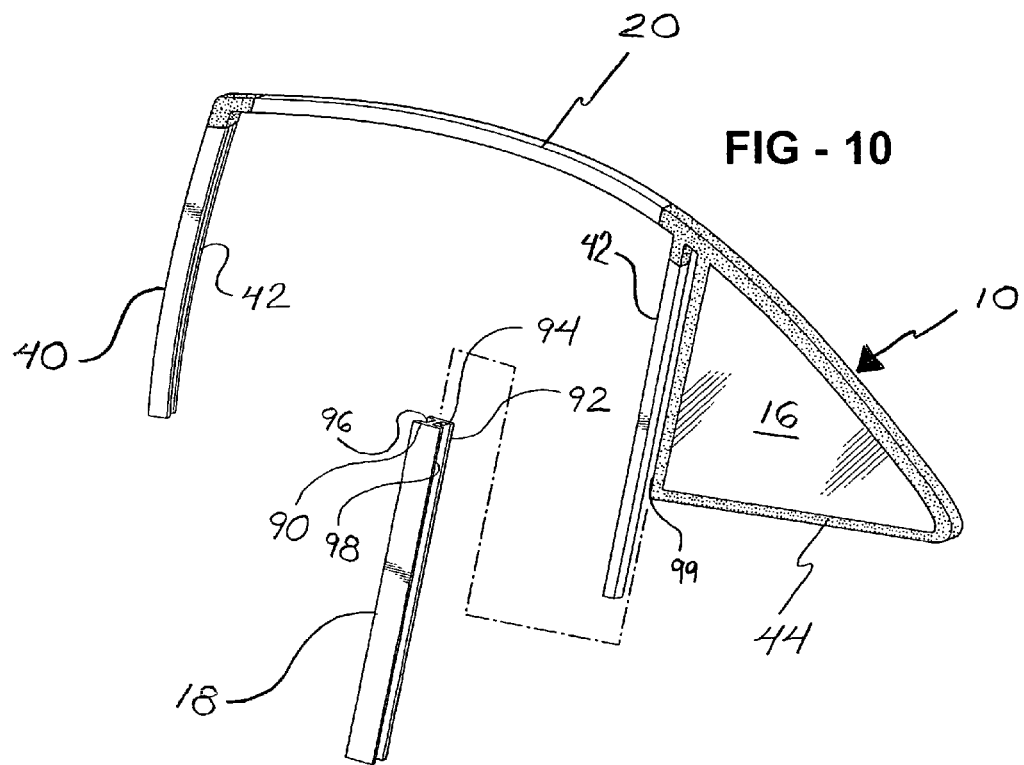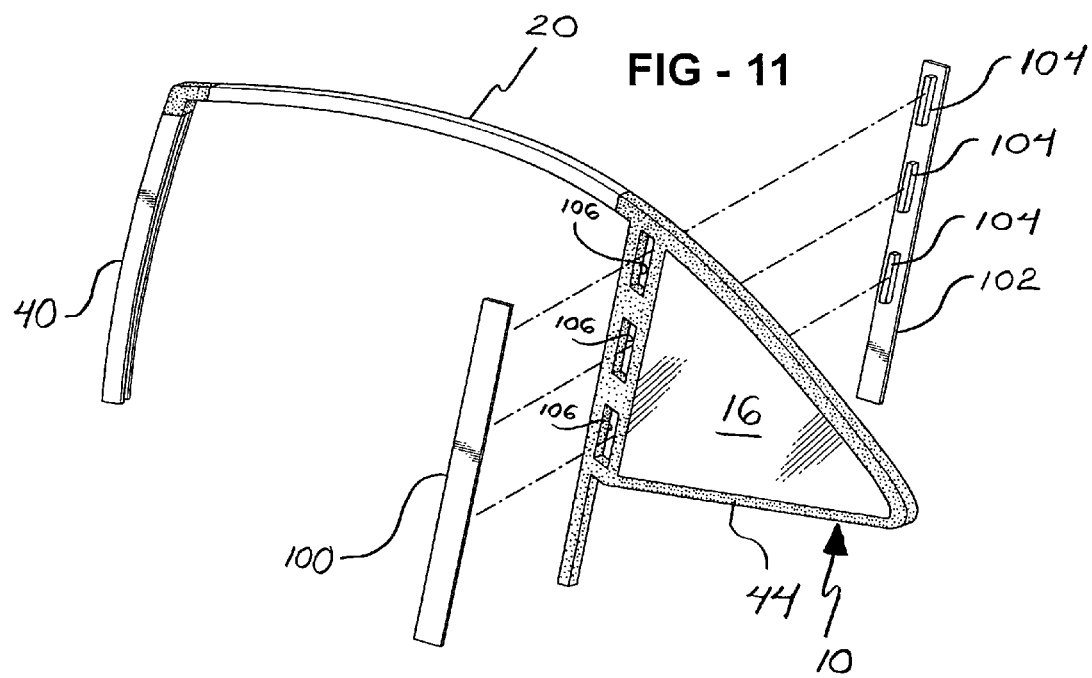

WINDOW SURROUND FOR A MOTOR VEHICLE

CROSS-REFERENCE TO RELATED APPLICATION

This application is a divisional application of U.S. patent application Ser. No. 11/037,656, filed on Jan. 18, 2005, which is hereby incorporated by reference.

FIELD OF THE INVENTION

The invention relates to a fixed window assembly for a motor vehicle rear door. More particularly, this invention relates to a fixed window assembly including an encapsulation molded to a fixed window pane for securing window components thereto prior to installation along a motor vehicle rear door.

DESCRIPTION OF RELATED ART

A rear door of a motor vehicle often includes both retractable and fixed window panes disposed within a window opening. The retractable window pane is located forward of the fixed window pane, and is movable between open and closed positions either manually or by power operation. The fixed window pane is typically smaller than the retractable window pane, and is separated therefrom by a rigid division post. Typically, the rear door also includes a header trim for contacting the retractable window pane as the retractable window pane moves between its open and closed positions.

The individual installation of each of the above-mentioned components to the rear door at an original equipment manufacturer (OEM) is a labor-intensive and, therefore, costly operation. For this reason, window modules have been developed for rear doors in order to reduce the assembly costs previously incurred at the OEM. Generally, such window modules involve pre-assembling each of the individual components described above at a location remote from the OEM, and then delivering the pre-assembled window module to the OEM for installation along the rear door of the motor vehicle. As a result, installation at the OEM is a cost-effective, one-step process.

U.S. Pat. No. 5,846,463 to Keeney et al. is directed to an encapsulated fixed window module for a motor vehicle. The window module includes a fixed window pane, a division post, and integrated trim. The division post defines a channel for receiving a movable window pane. The division post also includes a D-post trim disposed within the channel and having outside and inside lip portions. The outside lip portion forms a sealing surface on an outside surface of the movable window pane along a rear edge thereof. The inside lip portion seals an inside surface of the movable window pane. The integrated trim is molded onto the fixed window pane to secure the division post thereto. The integrated trim also includes a fully integrated header trim strip bonded to the outside lip portion at a corner of the movable window pane. More specifically, a header lip of the header trim strip is joined by a molded polymer to the outside lip portion of the D-post trim to form a continuous radial trim region that fits securely around and against the corner of the movable window pane. The injection molded polymer material fills in, therefore, the space between the header lip and the outside lip portion to form the radial trim region at the corner.

SUMMARY OF THE INVENTION

According to one aspect of the invention, a fixed window assembly is adapted to be fixedly secured to a door of a motor vehicle having a retractable window pane. The fixed window assembly includes a fixed window pane having an outer periphery. A division post extends along a portion of the outer periphery of the fixed window pane. A glass run is fixedly secured to the division post opposite the fixed window pane for receiving the retractable window pane. The glass run is formed from a first moldable material. An encapsulation is molded along the outer periphery of the fixed window pane for securing the division post to the fixed window pane. The encapsulation is formed from a second moldable material that is different from the first moldable material.

According to another aspect of the invention, a method of manufacturing a fixed window assembly, having a fixed window pane, a division post, an upper reveal having a fixed window segment, an outer belt having a fixed window segment, and an encapsulation, for a door of a motor vehicle utilizes a mold assembly including an upper mold and a lower mold having a plurality of receiving areas. The method includes the steps of: placing the fixed window pane in one of the plurality of receiving areas in the lower mold; placing a portion of the division post in one of the plurality of receiving areas of the lower mold adjacent to a portion of the fixed window pane; placing the fixed window segment of the upper reveal in one of the plurality of receiving areas of the lower mold adjacent to a portion of the fixed window pane; placing the fixed window segment of the outer belt in one of the plurality of receiving areas of the lower mold adjacent to a portion of the fixed window pane; injecting plastic material into the mold assembly; curing the plastic material to form the encapsulation securing the division post, the upper reveal, and the outer belt to the fixed window pane; and removing the fixed window assembly, including the division post, the upper reveal, and the outer belt secured to the fixed window pane by the encapsulation, from the mold assembly.

According to yet another aspect of the invention, a method of manufacturing a fixed window assembly, having a fixed window pane having an outer periphery, an upper reveal having a fixed window segment, a division post, and an encapsulation, for a door of a motor vehicle utilizes a mold assembly including an upper mold and a lower mold having a plurality of receiving areas. The method includes the steps of: placing the fixed window pane in one of the plurality of receiving areas of the lower mold; placing the fixed window segment of the upper reveal in one of the plurality of receiving areas of the lower mold adjacent to a portion of the outer periphery of the fixed window pane; injecting plastic material into the mold assembly; curing the plastic material to form the encapsulation along the entire outer periphery of the fixed window pane; removing the fixed window assembly, including the upper reveal secured to the fixed window pane by the encapsulation, from the mold assembly; and securing the division post to the encapsulation forward of the fixed window pane.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a cross-sectional view taken along lines 3-3 of FIG. 1;

FIG. 4 is a cross-sectional view taken along lines 4-4 of FIG. 1;

FIG. 10 is an exploded, perspective view of a fixed window assembly including a division post secured to the fixed window pane after the encapsulation has been molded thereto;

FIG. 11 is an exploded, perspective view of a fixed window assembly including a division post having a plurality of tabs for insertion into a respective plurality of slots along the encapsulation in order to secure the division post to the fixed window pane after the encapsulation has been molded thereto.

DETAILED DESCRIPTION OF THE PREFERRED EMBODIMENT

Figure 1:
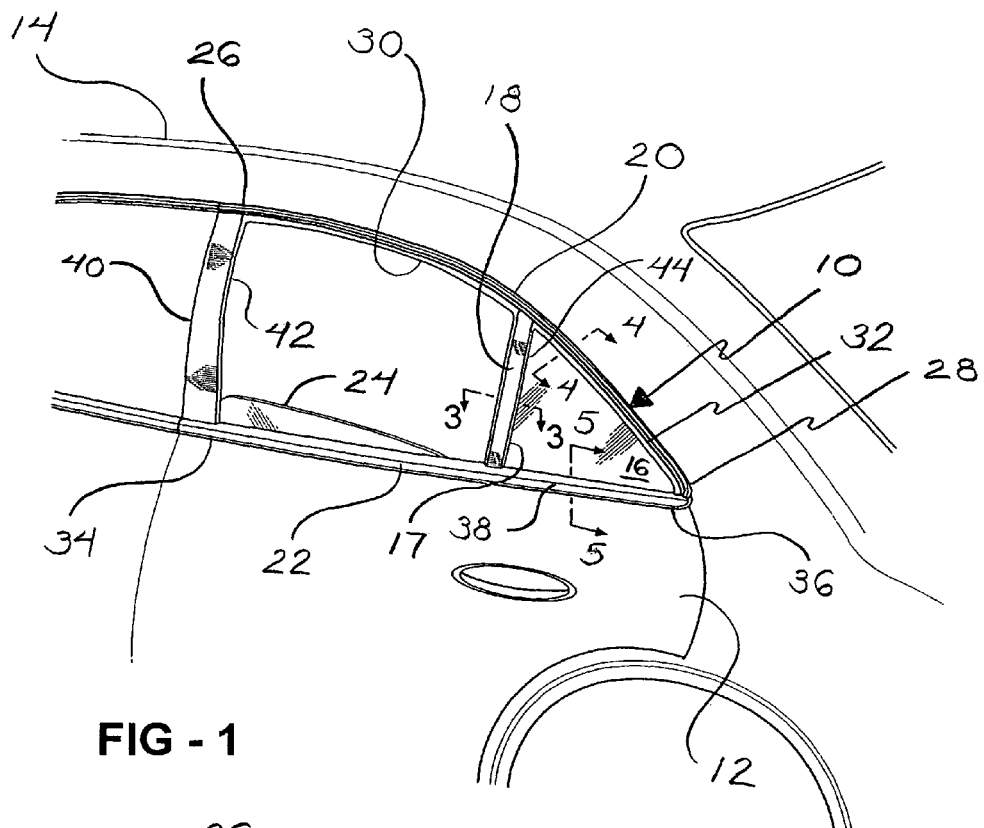
FIG. 1 is a fragmentary, perspective view of a motor vehicle including a fixed window assembly according to the invention installed along a rear door.
Figure 2:
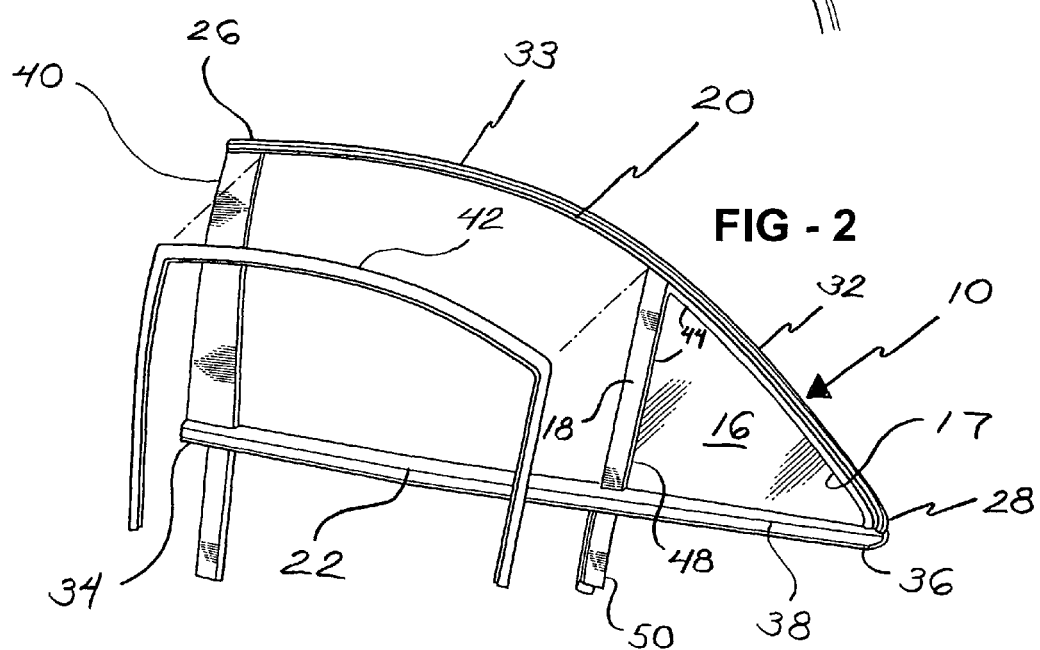
FIG. 2 is a perspective view of the fixed window assembly.

Referring to FIGS. 1 and 2, a fixed window assembly, generally indicated at 10, is provided for a rear door 12 of a motor vehicle 14. The fixed window assembly 10 includes a fixed window pane 16 having an outer periphery 17. The fixed window pane 16 is preferably formed from glass. It is, however, appreciated that the fixed window pane 16 may be formed from a plastic material.

A division post 18, an upper reveal 20, and an outer belt 22 each extend along a portion of the outer periphery 17 of the fixed window pane 16. The division post 18 extends vertically between the upper reveal 20 and the outer belt 22 to separate the fixed window pane 16 from a retractable window pane 24, which is shown in FIG. 1. Preferably, the division post 18 is a rigid, plastic member. The upper reveal 20, which extends between a front end 26 and a back end 28, conforms to the curvature of an upper edge of a window opening 30 of the rear door 12. A fixed window segment 32 of the upper reveal 20 extends along a portion of the outer periphery 17 of the fixed window pane 16, and a retractable window segment 33 extends forward of the fixed window segment 32. The outer belt 22 is generally linear and extends between a front end 34 and a rear end 36 abutting the back end 28 of the upper reveal 20. A fixed window segment 38 of the outer belt 22 extends along a portion of the outer periphery 17 of the fixed window pane 16. The outer belt 22 may be formed by co-extrusion or stamping.

A B-pillar appliqué 40 is fixedly secured to and extends vertically between the front end 26 of the upper reveal 20 and the front end 34 of the outer belt 22. Preferably, the B-pillar appliqué 40 is a rigid, injection molded member. The B-pillar appliqué may, however, be a roll formed and/or stamped metal member. A flexible glass run 42 extends along and is coupled to the B-pillar appliqué 40, the retractable window segment 33 of the upper reveal 20, and the division post 18 for contacting the retractable window pane 24 as the retractable window pane 24 slides vertically between open and closed positions. The glass run 42 is formed from a first moldable material. The first moldable material may be any of numerous materials including, but not limited to, TPV, PVC, and EPDM.

An encapsulation 44 is molded to the outer periphery 17 of the fixed window pane 16 to secure the division post 18, the upper reveal 20, and the outer belt 22 thereto. The encapsulation 44 is formed from a second moldable material, preferably TPV or PVC. It is, however, appreciated that the second moldable material may be any of various similar materials. Also in the preferred embodiment, the second moldable material (for the encapsulation 44) is different than the first moldable material (for the glass run 42). As a result, a different moldable material may be chosen for the glass run 42 and for the encapsulation 44 based upon the particular sealing and aesthetic considerations therefor.

The division post 18 includes an encapsulated segment 48 and a non-encapsulated segment 50, as shown in FIG. 2. The encapsulated segment 48 of the division post 18 is secured to the fixed window pane 16 by the encapsulation 44. The non-encapsulated segment 50 extends downwardly from the encapsulated segment 48 below the outer belt 22.

Referring to FIG. 3, the division post 18 includes a pair of spaced apart outer walls 52, 54 and a connecting wall 56 extending between the pair of spaced apart outer walls 52, 54. The encapsulation 44 is molded to the outer walls 52, 54 and the connecting wall 56 along the entire encapsulated segment 48 of the division post 18. The encapsulation 44 is also molded around a forward edge 58 of the fixed window pane 16. As a result, the encapsulation 44 secures the encapsulated segment 48 of the division post 18 to the fixed window pane 16.

The pair of spaced apart outer walls 52, 54 and the connecting wall 56 of the division post 18 define a channel 60. The glass run 42 is received within the channel 60 for frictional engagement with the division post 18. The glass run 42 includes a pair of sealing lips 62, 64 for sealingly engaging the retractable window pane 24. As stated above, the moldable material for the encapsulation 44 is different than the moldable material for the glass run 42. Thus, the fixed window assembly 10 advantageously incorporates two different moldable materials.

Referring to FIG. 4, the upper reveal 20 is adapted to be fixedly secured to a flange 66 along an upper portion of the rear door 12. The upper reveal 20 includes first and second closeout lips 65, 67 as well as spaced apart first 68 and second 70 legs. The first 68 and second 70 spaced apart legs define an inner channel 72 extending between the front end 26 and the back end 28. The encapsulation 44 is molded into place within the inner channel 72 and around an upper edge 74 of the fixed window pane 16 along the fixed window segment 28 of the upper reveal 20. As a result, the encapsulation 44 secures the upper reveal 20 to the fixed window pane 16.

Figure 5:
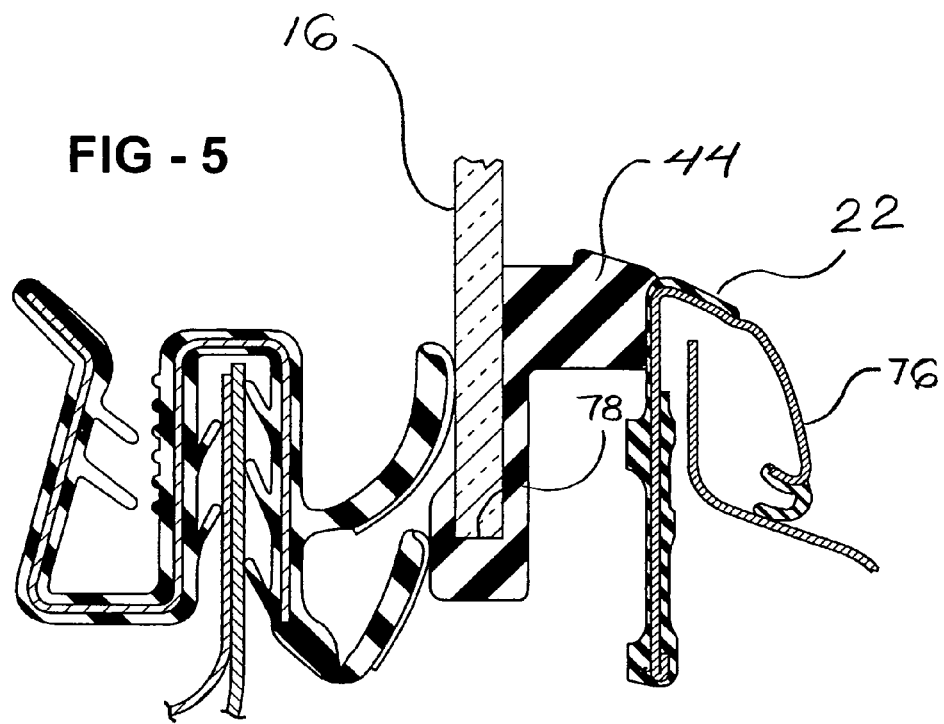
FIG. 5 is a cross-sectional view taken along lines 5-5 of FIG. 1.

Referring to FIG. 5, the outer belt 22 is adapted to be fixedly secured to an outer panel 76 of the rear door 12. The encapsulation 44 is molded around a lower edge 78 of the fixed window pane 16 and to the outer belt 22 such that the outer belt 22 is secured to the fixed window pane 16.

Figure 6:
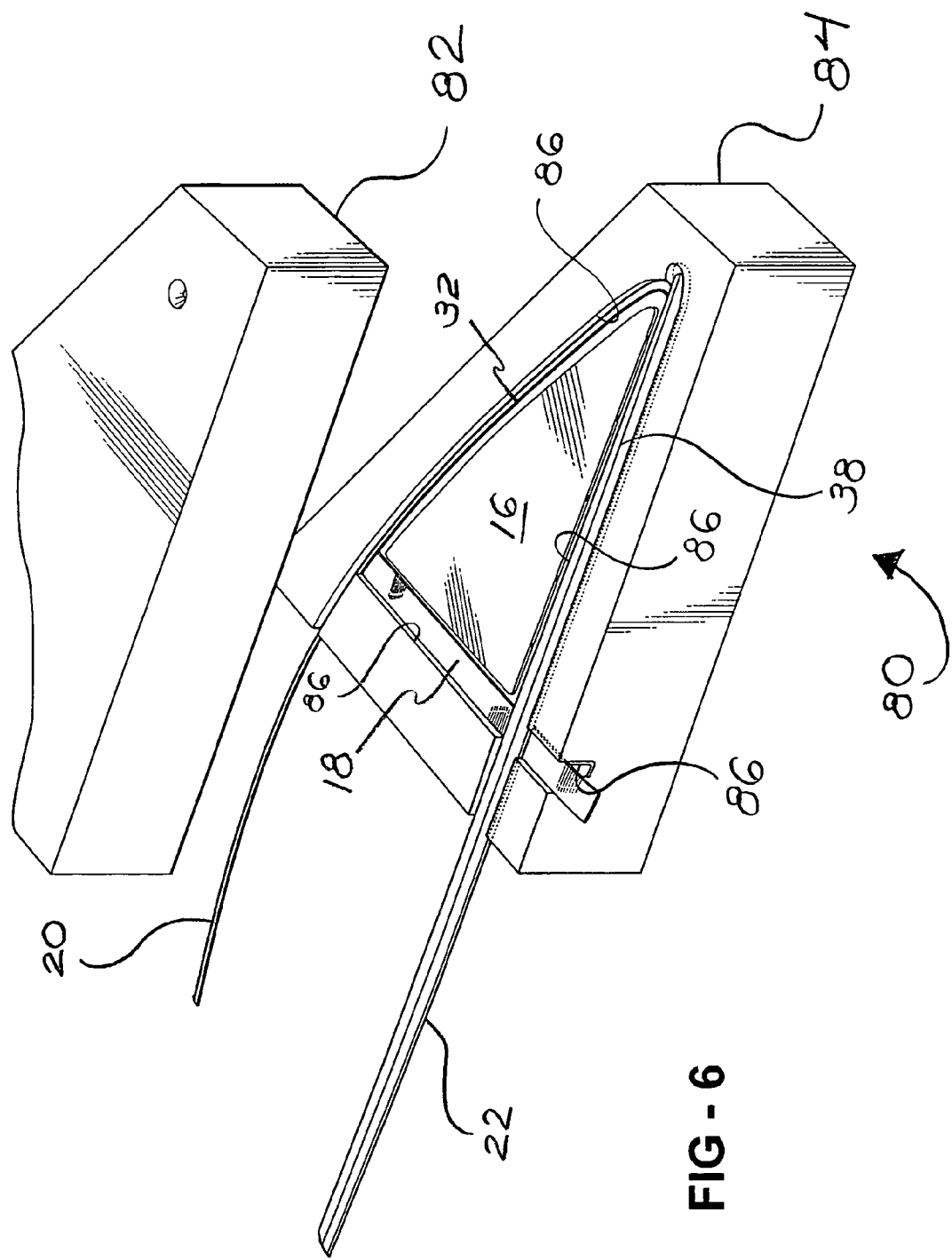
FIG. 6 is a fragmentary, perspective view of a mold assembly utilized during the manufacture of the fixed window assembly.

Referring to FIG. 6, a mold assembly, generally shown at 80, including upper 82 and lower 84 molds is provided for molding the encapsulation 44 to the fixed window pane 16. The lower mold 84 includes a plurality of receiving areas 86 shaped to receive the fixed window pane 16, a portion of the division post 18, the fixed window segment 32 of the upper reveal 20, and the fixed window segment 38 of the outer belt 22. Once the fixed window pane 16, the division post 18, the fixed window segment 32 of the upper reveal 20, and fixed window segment 38 of the outer belt 22 are in place, the upper mold 82 closes against the lower mold 84 and a plastic material is injected inside the mold assembly 80. When the plastic material is cured, the encapsulation 44, shown in FIGS. 2 through 5, is formed to secure the division post 18, the fixed window segment 32 of the upper reveal 20, and the fixed window segment 38 of the outer belt 22 to the fixed window pane 16.

The fixed window assembly 10 is pre-assembled away from the motor vehicle 14 prior to being delivered to an original equipment manufacturer (OEM) for installation along the rear door 12 of the motor vehicle 14. As a result, the labor costs associated with individually installing each component of the fixed window assembly 10 at the OEM are greatly reduced. In addition, pre-assembly of the fixed window assembly 10 away from the motor vehicle 14 ensures consistent assembly and quality at the OEM, that is, the inconsistencies that result from different OEM operators, lines, and shifts manufacturing the fixed window assembly are eliminated.

Figure 7:
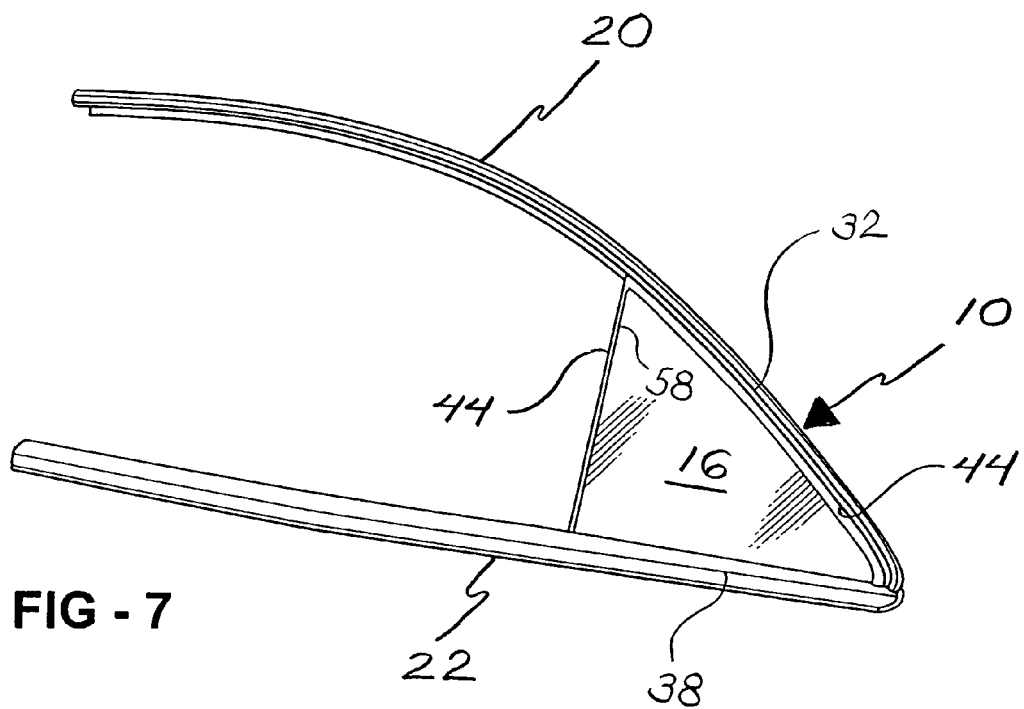
FIG. 7 is a perspective view of a fixed window assembly including an upper reveal and outer belt molded to a fixed window pane by an encapsulation.
Figure 8:
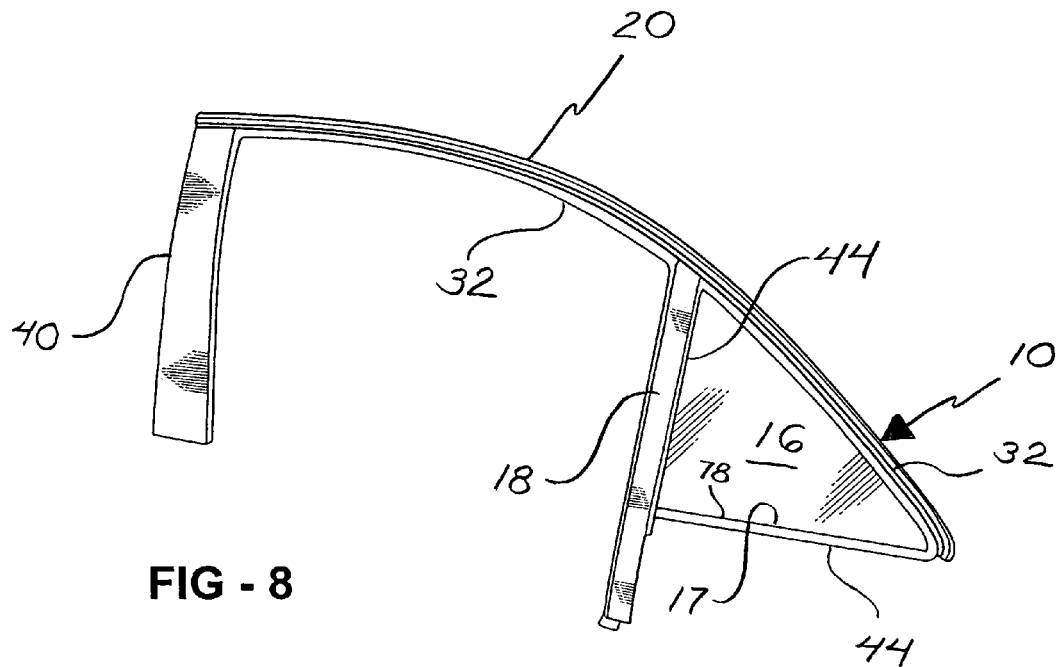
FIG. 8 is a perspective view of a fixed window assembly including a division post and upper reveal molded to the fixed window pane by an encapsulation.
Figure 9:
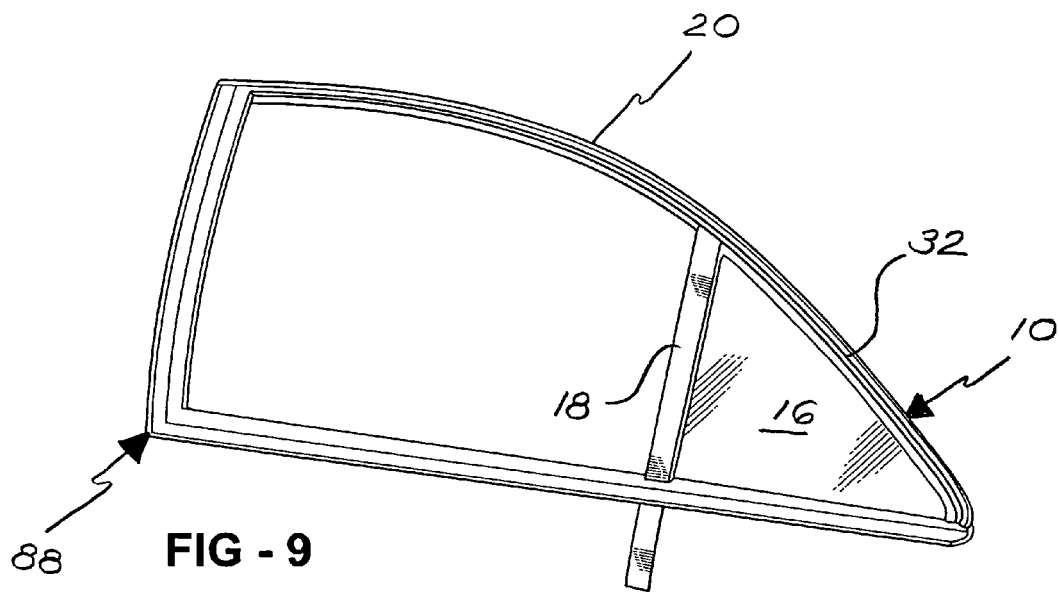
FIG. 9 is a perspective view of a fixed window assembly including a combination B-pillar appliqué and outer belt molded to the fixed window pane by the encapsulation.

Referring to FIGS. 7 through 9, the fixed window assembly 10 is shown in various alternative forms. Referring specifically to FIG. 7, the encapsulation 44 secures the fixed window segment 32 of the upper reveal 20 and the fixed window segment 38 of the outer belt 22 to the fixed window pane 16. The encapsulation 44 is formed along the forward edge 58 of the fixed window pane 16. After removal from the mold assembly 80, the division post 18 is secured to the fixed window pane 16 by any of numerous methods.

Referring to FIG. 8, the encapsulation 44 secures the division post 18 and the fixed window segment 32 of the upper reveal 20 to the fixed window pane 16. The encapsulation 44 is also formed along the lower edge 78 of the fixed window pane 16. After removal from the mold assembly 80, the outer belt 22 may be secured to the fixed window pane 16 by any of numerous methods.

Referring to FIG. 9, the encapsulation 44 secures the division post 18, the upper reveal 20, and a combination B-pillar and belt line molding, generally indicated at 88, to the fixed window pane 16.

In a method of manufacturing the fixed window assembly 10, the fixed window pane 16, a portion of the division post 18, the fixed window segment 32 of the upper reveal 20, and the fixed window segment 32 of the outer belt 22 are first placed in the plurality of receiving areas 86 of the lower mold 82. The upper mold 84 is then closed against the lower mold 82. Plastic material is then injected into the mold assembly 80, specifically, along the outer periphery 17 of the fixed window pane 16. The plastic material is then cured to form the encapsulation 44. The encapsulation 44 secures the division post 18, the fixed window segment 32 of the upper reveal 20, and the fixed window segment 38 of the outer belt 22 to the fixed window pane 16 to form the fixed window assembly 10. The mold assembly 80 is opened and the fixed window assembly 10 is removed therefrom. The B-pillar appliqué 40 is fixedly secured between the front end 26 of the upper reveal 20 and the front end 34 of the outer belt 22. The glass run 42 is secured along the B-pillar appliqué 40, the retractable window segment 33 of the upper reveal 20, and the division post 18. Finally, the fixed window assembly 10 is delivered to the OEM for installation along the rear door 12 of the motor vehicle 14.

Figure 12:
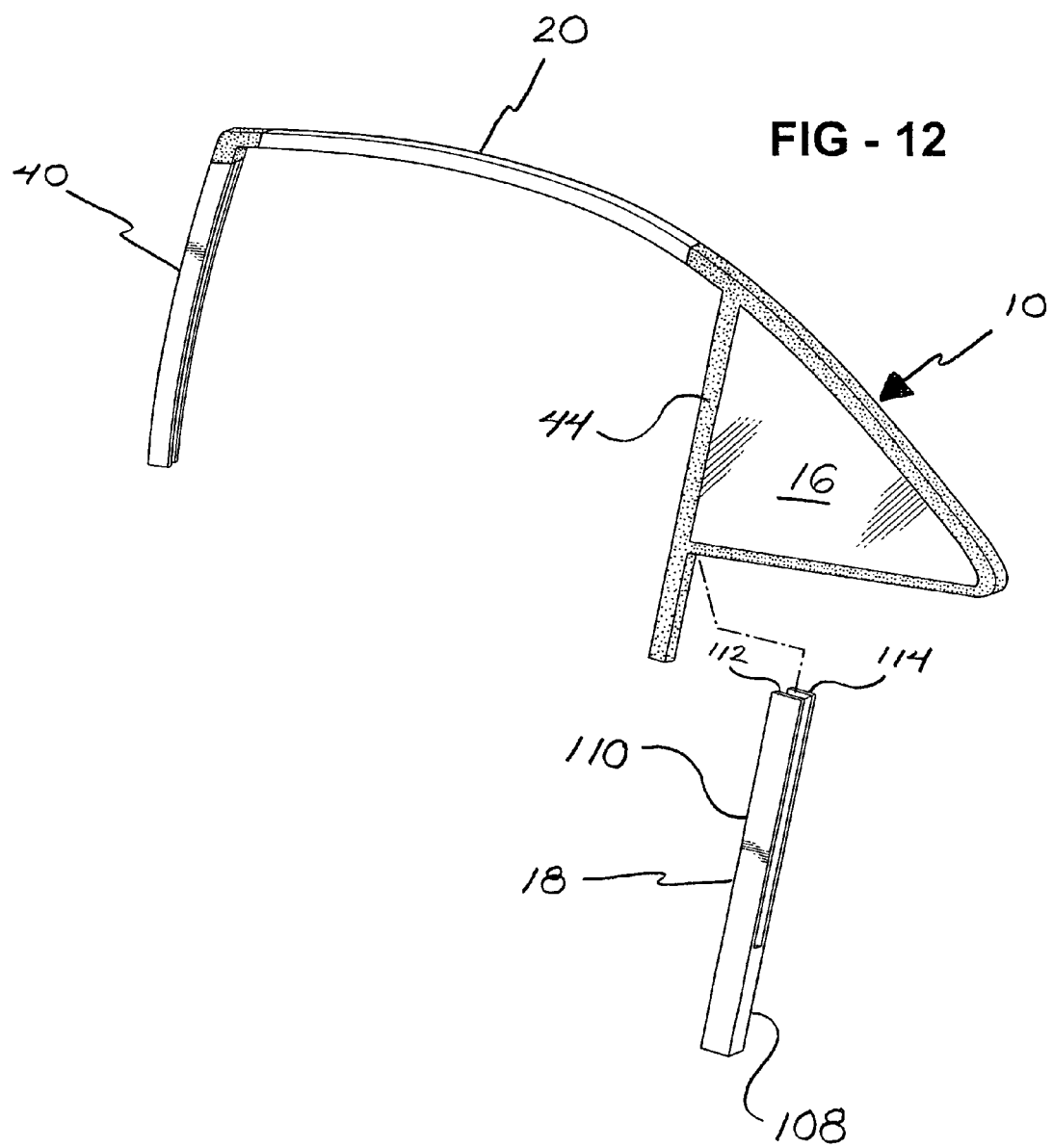
FIG. 12 is an exploded, perspective view of a fixed window assembly including a division post, having a generally C-shaped lower segment and pair of spaced apart post legs extending out therefrom, that is secured to the fixed window pane after the encapsulation has been molded thereto.

Referring to FIGS. 10 through 12, the division post 18 is secured to the fixed window pane 16 after the encapsulation 44 has been formed in the mold assembly 80. Referring specifically to FIG. 10, the division post 18 has a generally H-shaped cross-section, or I-beam configuration, and includes spaced apart outboard 90 and inboard 92 walls. A central member 94 extends between the outboard 90 and inboard 92 walls. The outboard wall 90, inboard wall 92, and central member 94 define opposing front 96 and rear 98 channels. After the fixed window pane 16 including the encapsulation 44 is removed from the mold assembly 80, the division post 18 is inserted within a gap 99 between the glass run 42 and the encapsulation 44 along the forward edge of the fixed window pane 16. The front channel 96 receives the glass run 42, and the rear channel 98 receives the encapsulation 44 along the forward edge of the fixed window pane 16. The division post 18 may be fixed into place by any of numerous methods known to those having ordinary skill in the art.

Referring to FIG. 11, the division post 18 includes outboard 100 and inboard 102 post members each having a plurality of tabs 104 extending out therefrom. A plurality of slots 106 is formed in the encapsulation 44 while in the mold assembly 80. After the fixed window pane 16, including the encapsulation 44, is removed from the mold assembly 80, the outboard 100 and inboard 102 post members are secured to the fixed window pane 16 by inserting the plurality of tabs 104 through the respective plurality of slots 106. The outboard 100 and inboard 102 post members are retained against the encapsulation 44 by welding, gluing, or the like.

Referring to FIG. 12, the division post 18 includes a lower segment 108 having a generally C-shaped cross-section and an upper segment 110 having first 112 and second 114 legs. The division post 18 is secured to the fixed window pane 16 after the molding of the encapsulation 44. The first 112 and second 114 legs fit around the encapsulation 44 such that the first leg 114 is visible along the exterior of the fixed window assembly 10. It is appreciated that the division post 18 may be secured along the encapsulation 44 in any of numerous methods as known to those of ordinary skill in the art.

In another method of manufacturing the fixed window assembly 10, the fixed window pane 16 and the fixed window segment 32 of the upper reveal 20 are placed in the plurality of receiving areas 86 of the mold assembly 80. The upper mold 84 is closed against the upper mold. Plastic material is injected into the mold assembly 80. The plastic material is cured to form the encapsulation 44 around the outer periphery 17 of the fixed window pane 16. The encapsulation 44 also secures the fixed window segment 32 of the upper reveal 20 to the fixed window pane 16. The mold assembly 80 is then opened and the fixed window assembly 80, including the fixed window pane 16, the upper reveal 20, and the encapsulation 44, is removed therefrom. Next, the division post 18 is secured to the encapsulation 44 adjacent the forward edge of the fixed window pane 16. The division post 18 may be secured to the encapsulation 44 in any of numerous methods known to those of ordinary skill in the art. In one alternative, the division post 18 includes the outboard 100 and inboard 102 post members each having the plurality of tabs 104 extending out therefrom. The plurality of tabs 104 fits inside the respective plurality of slots 106 formed along the encapsulation 44 to secure the outboard 100 and inboard 102 thereto. The outboard 100 and inboard 102 post members may be fixedly secured to the encapsulation 44 by welding, gluing, or the like.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A method of manufacturing a fixed window assembly, having a fixed window pane, a division post, an upper reveal having a fixed window segment, an outer belt having a fixed window segment, and an encapsulation, for a door of a motor vehicle utilizing a mold assembly including an upper mold and a lower mold having a plurality of receiving areas, the method comprising the steps of:

placing the fixed window pane in one of the plurality of receiving areas of the lower mold;

placing the fixed window segment of the upper reveal in one of the plurality of receiving areas of the lower mold adjacent to a portion of the fixed window pane;

placing the fixed window segment of the outer belt in one of the plurality of receiving areas of the lower mold adjacent to a portion of the fixed window pane;

injecting plastic material into the mold assembly;

curing the plastic material to form the encapsulation securing the upper reveal and the outer belt to the fixed window pane;

removing the fixed window assembly, including the upper reveal and the outer belt secured to the fixed window pane by the encapsulation, from the mold assembly; and securing the division post to the encapsulation subsequent to the step of removing the fixed window assembly, including the upper reveal and the outer belt secured to the fixed window pane by the encapsulation, from the mold assembly.

2. A method as set forth in claim 1 including the step of securing a glass run to a portion of the division post.

3. A method as set forth in claim 2 including the step of closing the upper mold against the lower mold prior to the step of injecting plastic material into the mold assembly.

4. A method as set forth in claim 3 including the step of opening the mold assembly prior to the step of removing the fixed window assembly, including the upper reveal and the outer belt secured to the fixed window pane by the encapsulation, from the mold assembly.

5. A method of manufacturing a fixed window assembly, having a fixed window pane having an outer periphery, an upper reveal having a fixed window segment, a division post, and an encapsulation, for a door of a motor vehicle utilizing a mold assembly including an upper mold and a lower mold having a plurality of receiving areas, the method comprising the steps of:

placing the fixed window pane in one of the plurality of receiving areas of the lower mold;

placing the fixed window segment of the upper reveal in one of the plurality of receiving areas of the lower mold adjacent to a portion of the outer periphery of the fixed window pane;

injecting plastic material into the mold assembly;

curing the plastic material to form the encapsulation along the entire outer periphery of the fixed window pane;

removing the fixed window assembly, including the upper reveal secured to the fixed window pane by the encapsulation, from the mold assembly; and securing the division post to the encapsulation forward of the fixed window pane subsequent to the step of removing the fixed window assembly, including the upper reveal secured to the fixed window pane by the encapsulation, from the mold assembly.

6. A method as set forth in claim 5 including the step of closing the upper mold against the lower mold prior to the step of injecting plastic material into the mold assembly.

7. A method as set forth in claim 6 including the step of opening the mold assembly prior to the step of removing the fixed window assembly, including the upper reveal secured to the fixed window pane by the encapsulation, from the mold assembly.

8. A method as set forth in claim 7 including the step of forming a plurality of slots along the encapsulation prior to the step of securing the division post to the encapsulation forward of the fixed window pane.

9. A method as set forth in claim 8 including the step of forming a plurality of outwardly extending tabs along the division post prior to the step of securing the division post to the encapsulation forward of the fixed window pane.

10. A method as set forth in claim 9 wherein the step of securing the division post to the encapsulation forward of the fixed window pane includes the step of inserting the plurality of tabs through the respective plurality of slots to couple the division post to the encapsulation.

11. A method as set forth in claim 10 wherein the step of securing the division post to the encapsulation forward of the fixed window pane includes the step of welding the division post to the encapsulation.

12. A method as set forth in claim 10 wherein the step of securing the division post to the encapsulation forward of the fixed window pane includes the step of taping the division post to the encapsulation.

13. A method of manufacturing a fixed window assembly, having a fixed window pane having an outer periphery, an upper reveal having a fixed window segment, a division post, and an encapsulation, for a door of a motor vehicle utilizing a mold assembly including an upper mold and a lower mold, the method comprising the steps of:

placing the fixed window pane in the lower mold;

placing the fixed window segment of the upper reveal in the lower mold adjacent to a portion of the outer periphery of the fixed window pane;

injecting plastic material into the mold assembly;

curing the plastic material to form the encapsulation along the entire outer periphery of the fixed window pane;

removing the fixed window assembly, including the upper reveal secured to the fixed window pane by the encapsulation, from the mold assembly; and securing the division post to the encapsulation subsequent to the step of removing the fixed window assembly, including the upper reveal secured to the fixed window pane by the encapsulation, from the mold assembly.

14. A method as set forth in claim 13 including the step of forming a plurality of slots along the encapsulation prior to the step of securing the division post to the encapsulation.

15. A method as set forth in claim 14 including the step of forming a plurality of outwardly extending tabs along the division post prior to the step of securing the division post to the encapsulation.

16. A method as set forth in claim 15 wherein the step of securing the division post to the encapsulation includes the step of inserting the plurality of tabs through the plurality of slots to couple the division post to the encapsulation.

17. A method as set forth in claim 13 including the step of forming a channel along the division post prior to the step of securing the division post to the encapsulation.

18. A method as set forth in claim 17 wherein the step of securing the division post to the encapsulation includes the step of inserting the encapsulation into the channel to couple the division post to the encapsulation.

19. A method as set forth in claim 13 including the step of forming an upper segment on the division post having first and second legs prior to the step of securing the division post to the encapsulation.

20. A method as set forth in claim 19 wherein the step of securing the division post to the encapsulation includes the step of fitting the first and second legs around the encapsulation to couple the division post to the encapsulation.

* * * * *